United States Patent [19]
Hester et al.

[11] Patent Number: 6,105,101
[45] Date of Patent: Aug. 15, 2000

[54] 16 BIT BIOS INTERRUPT CALLS UNDER 32 BIT PROTECTED MODE APPLICATION

[75] Inventors: Kenneth Hester, Houston; Loren S. Dunn, Spring, both of Tex.

[73] Assignee: Compaq Computer Corporation, Houston, Tex.

[21] Appl. No.: 09/073,481
[22] Filed: May 6, 1998
[51] Int. Cl.[7] .................................. G06F 13/24
[52] U.S. Cl. .................. 710/260; 710/9; 710/14; 710/65; 710/127; 711/171; 712/42; 712/43; 712/228; 712/243; 709/246; 709/300; 709/301; 709/302
[58] Field of Search ................. 710/260, 9, 14, 710/65, 127; 712/43, 42, 243, 228; 709/246, 301, 302, 300; 711/171

[56] References Cited

U.S. PATENT DOCUMENTS

| | | | |
|---|---|---|---|
| 4,493,027 | 1/1985 | Katz et al. | 712/228 |
| 5,539,899 | 7/1996 | Huynh et al. | 711/171 |
| 5,627,997 | 5/1997 | Pearson et al. | 710/65 |
| 5,638,517 | 6/1997 | Bartek et al. | 709/246 |
| 5,671,442 | 9/1997 | Feeney et al. | 710/14 |
| 5,710,941 | 1/1998 | Parry | 710/14 |
| 5,832,299 | 11/1998 | Wooten | 710/9 |
| 5,909,559 | 6/1999 | So | 710/127 |

OTHER PUBLICATIONS

"Desktop Management Interface Specification", Version 2.00, Mar. 27, 1996, pp. 1–199.

*Primary Examiner*—Glenn A. Auve
*Assistant Examiner*—Frantz Blanchard Jean
*Attorney, Agent, or Firm*—Conley, Rose & Tayon, P.C.

[57] ABSTRACT

A method for performing 16 Bit BIOS interrupt calls under a 32 Bit protected mode application. This has been impossible to-date and has forced BIOS development teams to add support into the BIOS for 32 bit function calls from 32 bit applications.

15 Claims, 2 Drawing Sheets

16 BIT BIOS INTERRUPT CALLS UNDER 32 BIT PROTECTED MODE APPLICATION

BACKGROUND AND SUMMARY OF THE INVENTION

This application relates to computer operating systems, and more particularly to 16-bit interrupt calls within a 32-bit operating system.

BACKGROUND: COMPUTER OPERATING SYSTEMS

A computer by itself is simply a set of hardware, and is incapable of operating on its own. An operating system knows how to talk to this hardware and can manage a computer's functions, such as allocating memory, scheduling tasks, accessing disk drives, and supplying a user interface. Without an operating system, software developers would be forced to write programs that directly access hardware—essentially reinventing the wheel with every new program. With an operating system such as Windows NT, developers can write to a common set of application programming interfaces (APIs) and let the operating system make the actual calls to the hardware.

Operating systems have grown increasingly complex over time. One change has been a gradual move from 8-bit, to 16-bit, to 32-bit operating systems. In order to facilitate backwards compatibility, it is preferable to provide means for applications written for, e.g., a 16-bit operating system to function in other operating systems, such as a 32-bit system.

An API is a series of functions that programs can use to make the operating system do their dirty work. Using Windows APIs, for example, a program can open windows, files, and message boxes—as well as perform more complicated tasks—by passing a single instruction.

Modern operating systems are typically built in layers, with each layer adding new capabilities, such as disk access techniques or a graphical user interface. But the essential layer, the foundation on which the rest of the operating system rests, is typically called a kernel. In general, the kernel provides low-level services, such as memory management, basic hardware interaction, and security. Without the kernel, the system would stop.

The Basic Input/Output System (BIOS) is typically coded into a computer system's ROM to provide the basic instructions for controlling system hardware. The operating system and application programs both directly access BIOS routines to provide better compatibility for such functions as screen display.

BACKGROUND: INTERRUPT CALLS

An interrupt call is used to "get the attention" of some portion of a computer system. Because it would take an inordinate amount of overhead to constantly poll each element of a computer system to determine if it requires attention, the system relies on each element to make an interrupt call to signal that it requires attention.

The current method used to call 16-bit BIOS from an application running in 32-bit operating system is to pass the data to a 16-bit real mode data server via OLE automation, and let the 16-bit real mode data server perform the interrupt. The process of converting from a 32-bit mode to a 16-bit mode is called "thunking," and results in significant wasted processor time. If an error occurs the results are unpredictable. The increased overhead decreases performance of the system.

The term "thunk" comes from the hypothetical sound a system process such as a Dynamic Linking Library (DLL) might make when switching between 16-bit and 32-bit operation. To call a 16-bit function with a 32-bit application, the application must first build a 16-bit stack and perform numerous other setup tasks, then call a thunk function.

A limitation of current methods is that while it is possible to call a 16-bit function with a 32-bit application by thunking, it is not possible to fully perform a 16-bit interrupt call by a 32-bit application.

INNOVATIVE METHOD FOR PERFORMING INTERRUPT CALLS

The general purpose of the invention is to provide a mechanism of performing 16 Bit BIOS interrupt calls under a 32 Bit protected mode application. This has been impossible to-date and has forced the BIOS development team to add support into the BIOS for 32 bit function calls from 32 bit applications.

The preferred method passes the interrupt request to a 32 Bit protected mode driver. The driver will construct the 16 Bit call, change the stack to a 16 Bit stack, and make the 16 Bit protected mode BIOS call. This process is much faster than the previous method. Because there is no mode switch (Thunk) from protected to real and from real back to protected mode, the process of making the ROM call is not noticeable. Also, this process only requires that the BIOS write 16-bit mode code that is capable of running in real or protected mode. This is accomplished by not hard-coding F000h as a data segment/selector. There is no need to re-code BIOS to support 32 Bit calls, which saves space and time.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The preferred embodiment provides a method for passing a 16-bit interrupt call in a 32-bit operating system. This method avoids the cost of thunking, and allows the calls to be made virtually invisibly to the application programmer.

The method is preferably embodied in a Windows NT 3.51/4.0 device driver. This driver is loaded when the NT system is started, and will automatically perform the preferred method when a 16-bit interrupt call is made.

Figure 1:
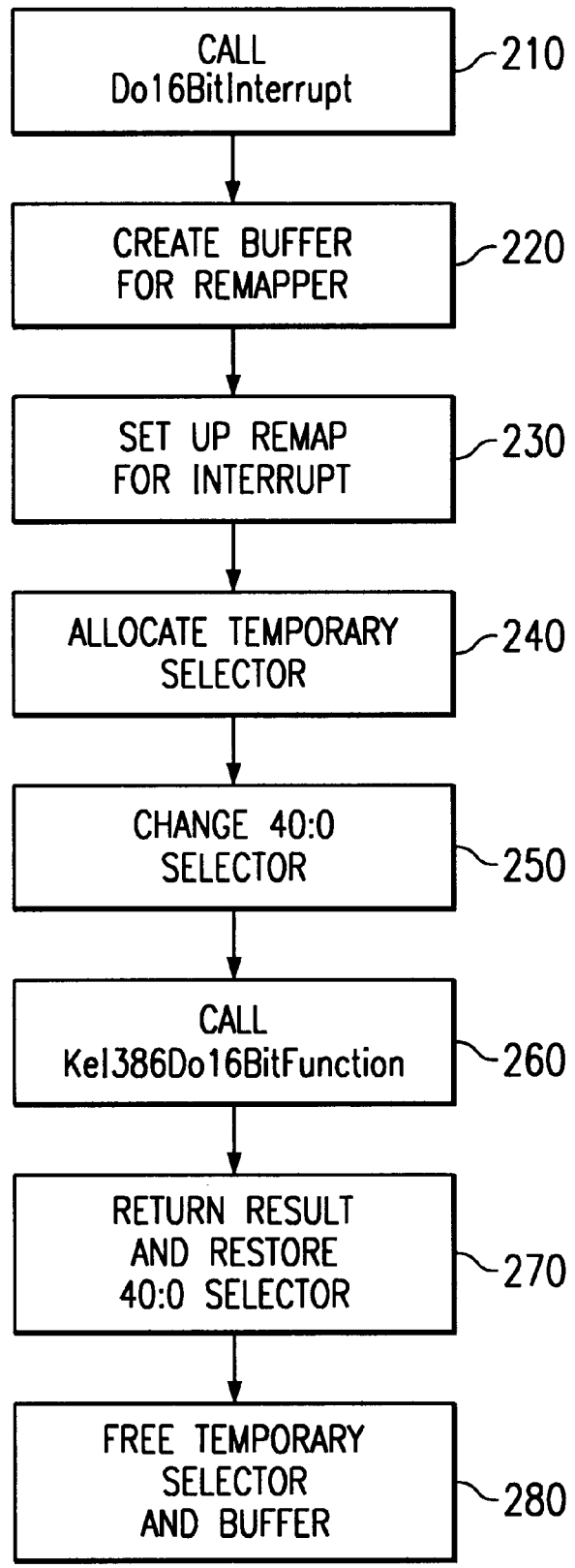
FIG. 1 shows a flowchart of the process of the presently preferred embodiment.

The preferred method, as shown in the flowchart of FIG. 1, is as follows:

(a.) When an application requires a 16-bit interrupt, it makes a call to a "Do16BitInterrupt" function (step 210), and passes the necessary arguments as described in more detail below.

(b.) Upon detection of a request to make a 16-bit interrupt call, the "clntmgmt.sys" device driver creates a buffer in memory to hold the remapping code (step 220).

(c.) The driver then remaps said interrupt request to correspond to the structure of the system memory and produces a remapped interrupt request (step 230).

(d.) The driver then allocates a temporary selector (step 240).

(e.) The device driver then saves the state of the 40:0 selector in the temporary selector, and changes the 40:0 selector to the BIOS data area (step 250), which effectively remaps the ROM data area into the appropriate ROM address.

(f.) Using the Ke386Do16BitFunction call (step 260), the device driver makes the call to the remapper, which in turn redirects the call to BIOS.

(g.) The result code from the interrupt is passed back to the remapper and then returned to the calling application. The 40:0 selector is then restored to its previous state (step 270).

(h.) The temporary selector and the allocated buffer are freed (step 280).

Note that 16-bit functions and applications use a "segment:offset" addressing scheme. "40:0" therefore indicates an address at segment 40, offset 0. In typical x86 computer systems, the 40:0 area is the BIOS data area. A selector is a pointer to data structures that define the characteristics of a memory segment.

Using the process described above, the application is able to simply call the Do16BitInterrupt function, and the call is made without any requirement of manually converting to the 16-stack to make the call. Windows NT 4.0 provides one undocumented 16-bit function, called KeI386Do16BitFunction, which is used for Advanced Power Management (APM) functions. However, KeI386Do16BitFunction does not provide for IRET returns used by interrupts, and is therefore unsuitable for 16-bit interrupt applications.

The preferred embodiment exploits the built-in functionality of KeI386Do16BitFunction, but allows an interrupt return. This is done by building the Do16BitInterrupt function so that it takes advantage of the old function, but includes a map of the stack to handle IRET returns.

Therefore, when a 16-bit interrupt is needed, the NT Kernel sends the 16-bit function to the remapper, instead of directly to ROM (for which the user would manually have to switch (thunk) to 16 bits). The remapper changes the stack, and pushes our function on the stack. The call is passed to ROM with the values on the Stack. ROM executes the 16-bit call, adds the result to the stack and passes it back to the remapper. The remapper restores the stack, and passes the result back to the kernel.

The following specification sheet for clntmgmt.sys shows the arguments and data required by the Do16BitInterrupt function:

| Parameter | Expected Value |
| --- | --- |
| dwIoControlCode | IOCTL_CPQMGMT_DO_16INT15_CALL |
| lpvInBuffer | Address of IREGS_STRUCT_NT structure defining the INT 15th call to execute. |

-continued

| Parameter | Expected Value |
| --- | --- |
| CbInBuffer | size of (IREGS_STRUCT_NT) |
| lpvOutBuffer | Address of IREGS_STRUCT_NT structure defining the INT 15th call to execute. |
| CbOutBuffer | size of (IREGS_STRUCT_NT) |
| lpcbBytesReturned | Points to a DWORD that receives the actual size, in bytes, of the data stored into lpvOutBuffer. |

$IREGS_{13}$ STRUCT$_{\_NT\_}$16

| Member | Expected Value |
| --- | --- |
| dwEAX | Input/output value of EAX register for call |
| dwEBX | Input/output value of EBX register for call |
| dwECX | Input/output value of ECX register for call |
| dwEDX | Input/output value of EDX register for call |
| dwEDl | Input/output value of EDI register for call |
| dwESI | Input/output value of ESI register for call |
| dwRcsl | reserved (should be 0) |
| dwEflags | input/output value of Eflags register for call |
| dwInterrupt | Interrupt for the request to be routed through |

Upon successful completion of the routine, the function returns the contents of IREGS_STRUCT$_{\_NT\_}$16, plus the buffer (if specified).

Figure 2:
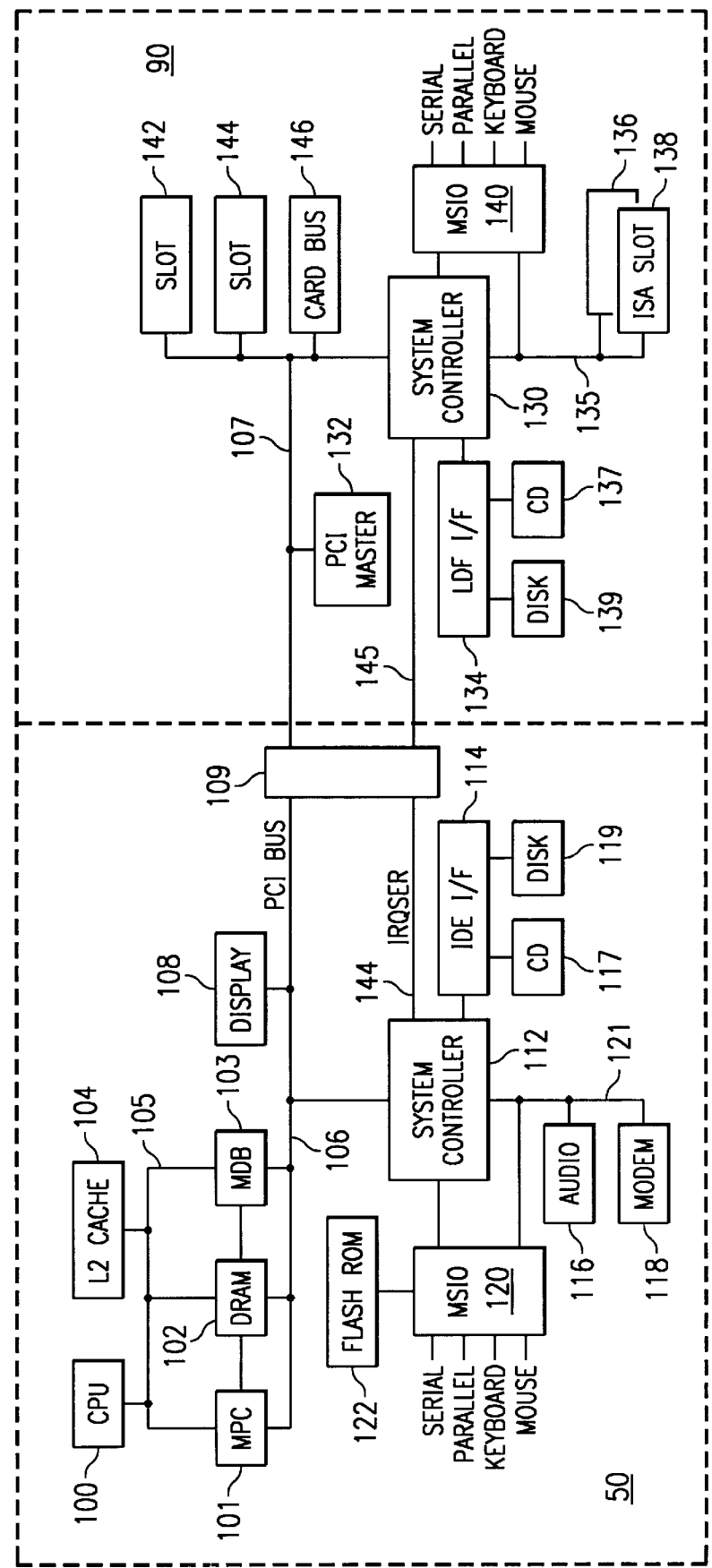
FIG. 2 shows a block diagram of a computer system according to the presently preferred embodiment.

In the preferred embodiment, the innovative method is performed by a computer system S as shown FIG. 2. In FIG. 2, the system S includes a portable computer 50 and an expansion base unit 90. Within the portable computer 50, a CPU 100 and a level two (L2) cache 104 are connected to a high speed local bus 105. The processor 100 of the preferred embodiment is one of the 80×86 microprocessor family manufactured by Intel Corporation of Santa Clara, California. In the preferred embodiment, the processor operates with a Windows NT®, available from Microsoft Corporation of Redmond, Washington. The L2 cache 104 provides additional caching capabilities to the processor's on-chip cache to improve performance.

In addition to the CPU 100 and cache 104, a number of memory interface and memory devices are connected between the local bus 105 and a PCI bus 106. These devices include a memory to PCI cache controller (MPC) 101, a dynamic random access memory (DRAM) array 102, and a memory data buffer (MDB) 103. The MPC 101 is connected to the DRAM array 102, which is further connected to the MDB 103. The MPC 101, DRAM array 102, and MDB 103 collectively form a high performance memory system for the computer system S. A display 108 is also connected to a PCI bus 106.

The PCI bus 106 is also connected to a system controller 112. The system controller 112 is a PCI to ISA bus bridge which also provides various support functions distributed between the portable computer 50 and the expansion base unit 90 of the system S. Preferably the system controller 112 is a single integrated circuit that acts as a PCI bus master and slave, an ISA bus controller, an ISA write posting buffer, an ISA bus arbiter, DMA devices, and an IDE disk interface. The system controller 112 is connected to an audio board 116 and a modem 118 as conventionally present in PC systems to provide sound and data communication capabilities for the system S via a first ISA interface 121. The IDE interface 114 of the system controller 112 drives one or more hard disk drives, preferably a CD-ROM player 117 and a disk drive 119. Further, the system controller 112 provides a single pin output to support a interrupt serial bus (IRQSER) 144.

The system controller 112 is connected to an MSIO (mobile super I/O) chip 120. The MSIO 120 is connected to a flash ROM 122. The flash ROM 122 receives its control, address and data signals from the MSIO 120. Preferably, the flash ROM 122 contains the BIOS information for the computer system S and can be reprogrammed to allow for revisions of the BIOS. Additionally, the MSIO 120 provides a parallel port, a serial port, a keyboard interface and a mouse interface, among others, for the computer system S.

A plurality of Quick Connect switches 109 are also connected to the PCI bus 106. Upon detecting a docking sequence between the portable computer 50 and the base unit 90, the Quick Connect switches 109 couple the PCI bus 106 and the IRQSER bus 144 to an expansion PCI bus 107 and an expansion IRQSER bus 145 on the base unit 90. The Quick Connect switches 109 are series in-line FET transistors having low rds, or turn-on resistance, values to minimize the loading on the PCI buses 106 and 107 and the IRQSER buses 144 and 145.

Turning now to the expansion base unit 90, one or more PCI masters 132 are connected on the expansion PCI bus 107, which is adapted to be connected to the PCI bus 106 over the Quick Switches 109 when the portable computer 50 is docked to the expansion base unit 90. The PCI bus 107 is also connected to PCI slots 142 and 144 and also to a card-bus interface 146 for accepting expansion cards. Also connected to the expansion PCI bus 107 is a second system controller 130, which is preferably a second integrated circuit of the same type as the system controller 112. The system controller 130 is connected to the expansion PCI bus 107 and the interrupt serial bus 145. The system controller 130 supports additional drives 137 and 139 through a second IDE interface 134. The system controller 130 also supports an ISA bus 135 which is connected to one or more ISA slots 136 and 138. The system controller 130 is further connected to a second MSIO device 140, which provides a secondary parallel port, serial port, keyboard interface and mouse interface.

Thus, the system S, upon docking, may have multiple parallel ports, serial ports, keyboards, mice, and disk drives via the system controllers 112 and 130. Additionally, the system S may have a plurality of PCI and ISA type peripherals on their respective buses. The availability of a plurality of slots allows more peripherals to be connected to the system S and contributes to the useability and flexibility of the portable computer 50 when it is docked to the expansion base unit 90.

The plurality of IDE interfaces 114 and 134 on system controllers 112 and 130 provide the capability to expand the data storage capability of the system S. The IDE interfaces 114 and 134 require a mechanism for mapping drives configured in the master—master configuration into a master-slave configuration when the portable computer 50 is docked to the base expansion unit 90 for BIOS compatibility purposes and which remaps the drives back into a master-master mode after the separation of the portable computer 50 from the base expansion unit 90 to ensure optimal performance.

According to one disclosed class of innovative embodiments, there is provided a method, comprising the steps of (a) detecting an interrupt request in a computer system; (b) storing at least a portion of the current state of the computer system; (c) re-mapping said interrupt request to correspond to the structure of a system memory and producing a remapped interrupt request; (d) executing an interrupt routine stored in said system memory at a location corresponding to said remapped interrupt request and producing a return code.

According to another disclosed class of innovative embodiments, there is provided a method for making an interrupt call in a computer operating system, comprising the steps of (a) detecting, in a computer system operating in a first mode, a request for an interrupt to be made in a second mode; (b) storing at least a portion of the current state of the computer system; (c) re-mapping said interrupt request to correspond to a request in said second mode and producing a remapped interrupt request; (d) executing an interrupt routine stored in said system memory at a location corresponding to said remapped interrupt request and producing a return code; and (e) converting said return code to be compatible with said first mode.

According to another disclosed class of innovative embodiments, there is provided a computer system, comprising a user input device; a microprocessor operatively connected to detect inputs from said input device; memory which is connected to be read/write accessible by said microprocessor; a video controller connected to said microprocessor; a display operatively connected to display data generated by said video controller at a first refresh rate; a power supply connected to provide power to said microprocessor, said memory, and said display; wherein said computer system is configured to perform the steps of (i.) detecting, when said computer system is operating in a first mode, a request for an interrupt to be made in a second mode; (ii.) storing at least a portion of the current state of the computer system in said memory; (iii.) re-mapping said interrupt request to correspond to a request in said second mode and producing a remapped interrupt request; (iv.) executing an interrupt routine stored in said memory at a location corresponding to said remapped interrupt request and producing a return code; and (v.) converting said return code to be compatible with said first mode.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

In the sample computer system embodiment the user input devices can alternatively include a trackball, a joystick, a 3D position sensor, voice recognition inputs, or other inputs. Similarly, the output devices can optionally include speakers, a display (or merely a display driver), a modem, or other outputs.

What is claimed is:

1. A method for operating a computer, comprising the steps of:
    (a.) detecting an interrupt request in said computer;
    (b.) storing at least a portion of the current state of said computer;
    (c.) re-mapping said interrupt request to correspond to the structure of a system memory and producing a remapped interrupt request;
    (d.) executing an interrupt routine stored in said system memory at a location corresponding to said remapped interrupt request and producing a return codes;
    wherein said steps a–d are performed without thinking.

2. The method of claim 1, wherein said computer system is an x86-compatible system.

3. The method of claim 1, wherein said system is operating a Microsoft Windows NT® operating system.

4. The method of claim 1, wherein said computer system is operating in a 32-bit mode.

5. The method of claim 1, wherein said remapped interrupt request is a 16-bit interrupt.

6. A method for making an interrupt call in a computer operating system, comprising the steps of:
   (a.) detecting, in a computer system operating in a first, protected, mode, a request for an interrupt to be made in a second mode;
   (b.) storing at least a portion of the current state of the computer system;
   (c.) re-mapping said interrupt request to correspond to a request in said second mode and producing a remapped interrupt request;
   (d.) executing an interrupt routine stored in said system memory at a location corresponding to said remapped interrupt request and producing a return code; and
   (e.) converting said return code to be compatible with said first mode;
   wherein said steps a–e are performed without thinking.

7. The method of claim 6, wherein said computer system is an x86-compatible system.

8. The method of claim 6, wherein said system is operating a Microsoft Windows NT® operating system.

9. The method of claim 6, wherein said first mode is a 32-bit operating mode.

10. The method of claim 6, wherein said second mode is a 16-bit operating mode.

11. A computer system, comprising:
   a user input device;
   a microprocessor operatively connected to detect inputs from said input device;
   memory which is connected to be read/write accessible by said microprocessor;
   a video controller connected to said microprocessor;
   a display operatively connected to display data generated by said video controller at a first refresh rate;
   a power supply connected to provide power to said microprocessor, said memory, and said display;
   wherein said computer system is configured to perform, without thinking the steps of
      (i.) detecting, when said computer system is operating in a first mode, a request for an interrupt to be made in a second mode;
      (ii.) storing at least a portion of the current state of the computer system in said memory;
      (iii.) re-mapping said interrupt request to correspond to a request in said second mode and producing a remapped interrupt request;
      (iv.) executing an interrupt routine stored in said memory at a location corresponding to said remapped interrupt request and producing a return code; and
      (v.) converting said return code to be compatible with said first mode.

12. The system of claim 11, wherein said computer system is an x86-compatible system.

13. The system of claim 11, wherein said system is operating a Microsoft Windows NT® operating system.

14. The system of claim 11, wherein said first mode is a 32-bit operating mode.

15. The system of claim 11, wherein said second mode is a 16-bit operating mode.

* * * * *